US011407524B2

(12) United States Patent
Fernandes et al.

(10) Patent No.: US 11,407,524 B2
(45) Date of Patent: Aug. 9, 2022

(54) AIRCRAFT UNDERCARRIAGE FITTED WITH VISUAL WARNING MEANS FOR SIGNALING AN ANGULAR OVERSTROKE OF A STEERABLE BOTTOM PORTION OF THE UNDERCARRIAGE

(71) Applicant: SAFRAN LANDING SYSTEMS, Velizy Villacoublay (FR)

(72) Inventors: Philippe Fernandes, Moissy-Cramayel (FR); Marc Farcy, Moissy-Cramayel (FR); Christophe Clement, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 231 days.

(21) Appl. No.: 16/905,249

(22) Filed: Jun. 18, 2020

(65) Prior Publication Data
US 2020/0398996 A1 Dec. 24, 2020

(30) Foreign Application Priority Data

Jun. 19, 2019 (FR) ...................................... 19 06614

(51) Int. Cl.
*B64D 45/00* (2006.01)
*B64C 25/50* (2006.01)

(52) U.S. Cl.
CPC .......... *B64D 45/0005* (2013.01); *B64C 25/50* (2013.01)

(58) Field of Classification Search
CPC ............................ B64C 25/50; B64D 45/0005
See application file for complete search history.

(56) References Cited

U.S. PATENT DOCUMENTS

| 8,902,084 | B2 * | 12/2014 | Ataman | ................... | H01H 3/16 |
| | | | | | 340/960 |
| 9,139,295 | B2 * | 9/2015 | Benmoussa | ............. | B64C 25/50 |
| 9,272,792 | B2 * | 3/2016 | Hodgkinson | ........... | B64C 25/00 |
| 11,142,336 | B2 * | 10/2021 | Farcy | ..................... | B64D 45/00 |
| 2011/0214601 | A1 * | 9/2011 | Martin | ................... | B64D 45/00 |
| | | | | | 116/203 |

FOREIGN PATENT DOCUMENTS

| FR | 2 963 606 A1 | 2/2012 |
| WO | 2007/110566 A1 | 10/2007 |
| WO | 2014/117248 A1 | 8/2014 |

OTHER PUBLICATIONS

French Preliminary Search Report for 1906614 dated Feb. 7, 2020.

* cited by examiner

*Primary Examiner* — Philip J Bonzell
*Assistant Examiner* — Michael B. Kreiner
(74) *Attorney, Agent, or Firm* — Sughrue Mion, PLLC

(57) ABSTRACT

An aircraft undercarriage comprising a top portion (2) secured to the aircraft and a steerable bottom portion (3) carrying wheels and suitable for being steered by a steering control system (4) fitted to the undercarriage or else by an external towing device, the undercarriage being fitted with visual warning means (9) for indicating an angular overstroke. The visual warning means comprising at least one visual indicator (14) mounted to move between a retracted position that is invisible and an extended position that is visible.
An aircraft provided with an undercarriage.

11 Claims, 3 Drawing Sheets

[Fig. 1]
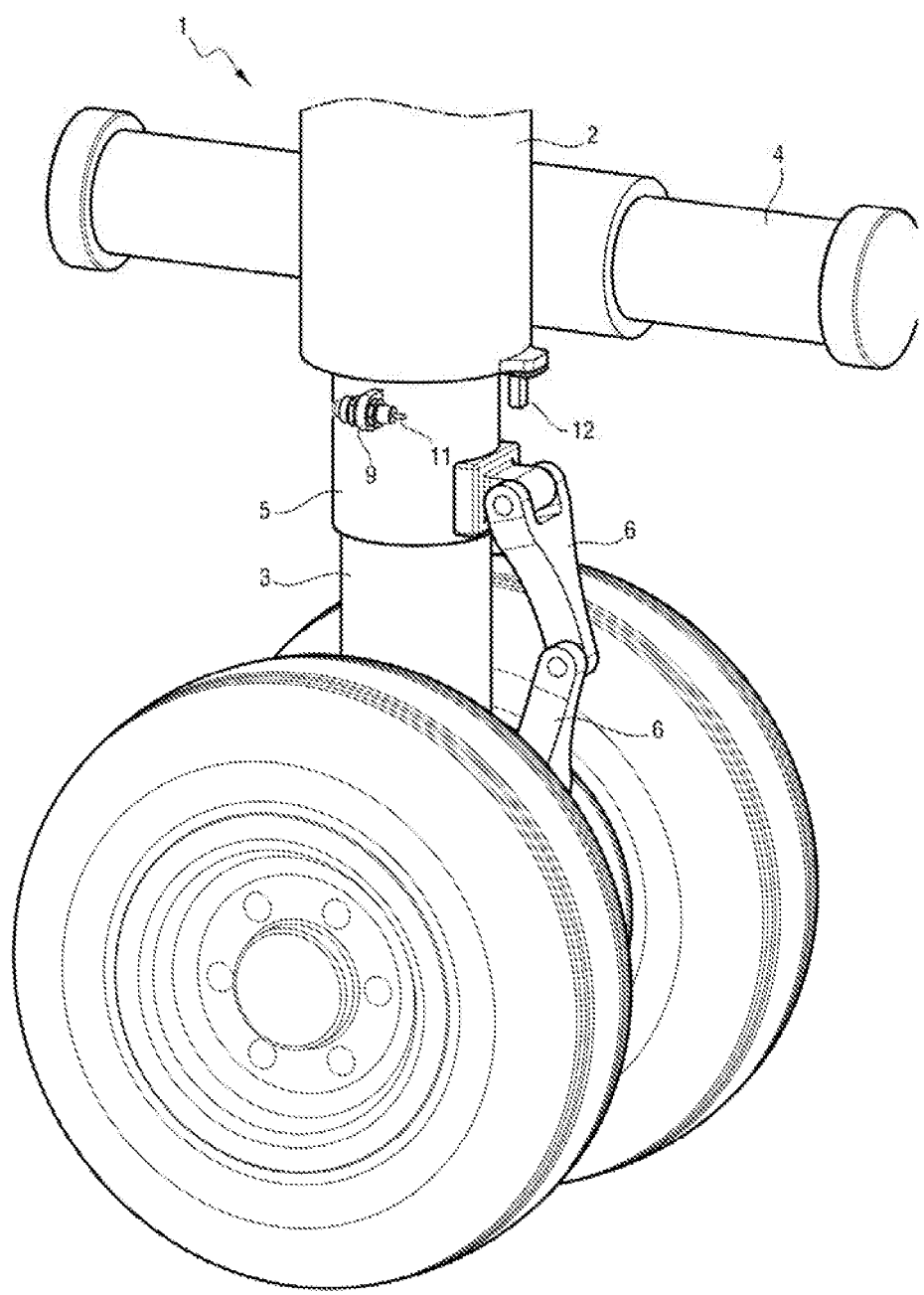

[Fig. 2]
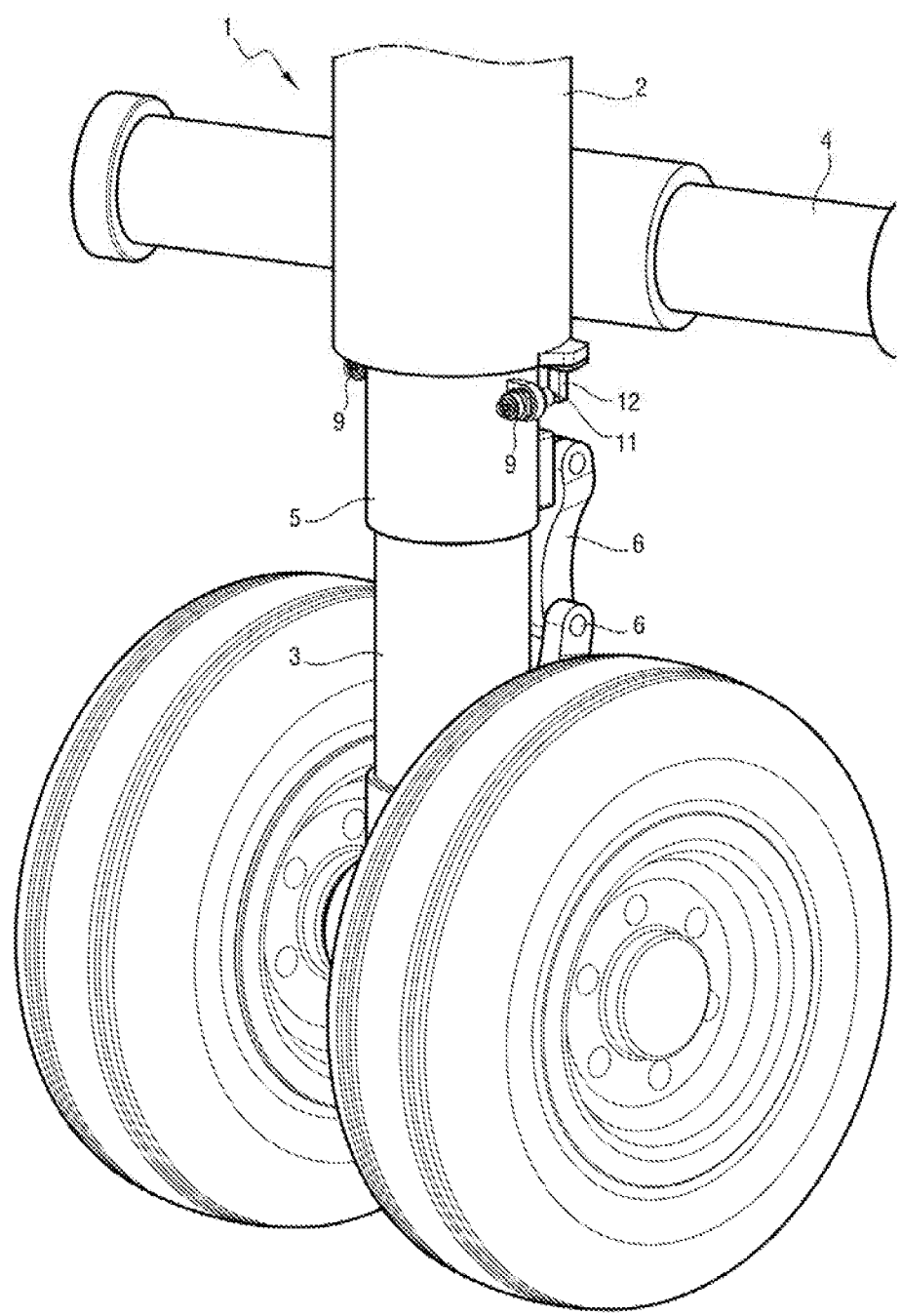

[Fig. 3]
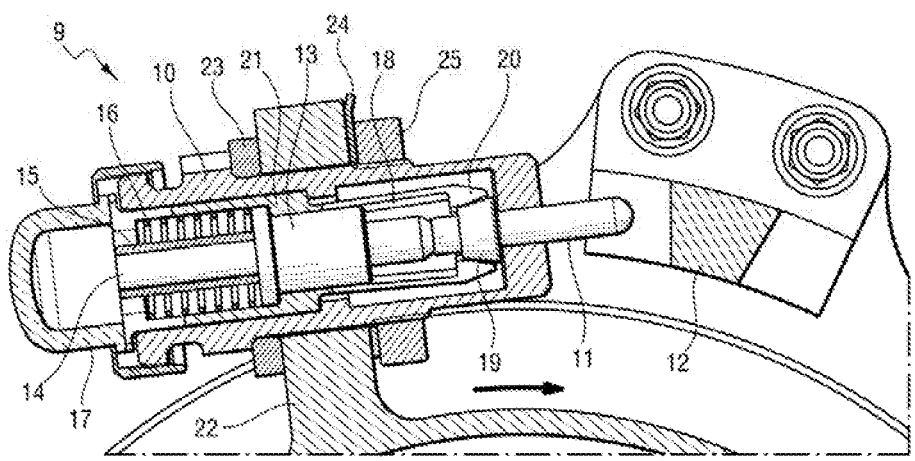
[Fig. 4]
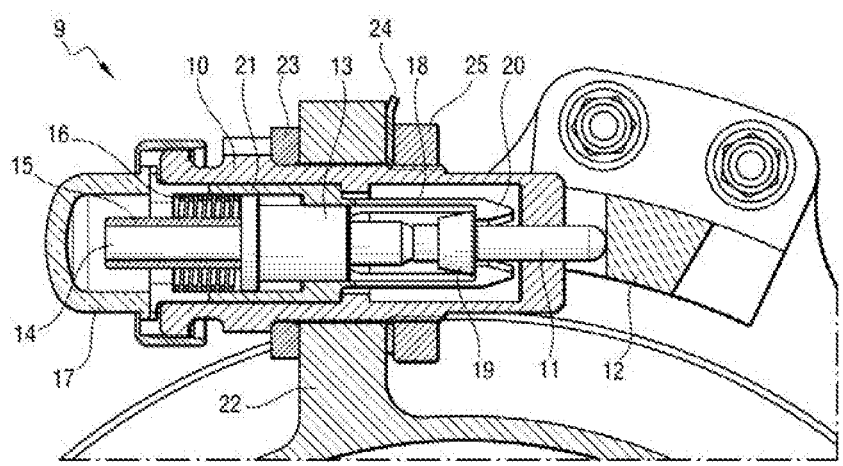

AIRCRAFT UNDERCARRIAGE FITTED WITH VISUAL WARNING MEANS FOR SIGNALING AN ANGULAR OVERSTROKE OF A STEERABLE BOTTOM PORTION OF THE UNDERCARRIAGE

The invention relates to the field of aviation, and more particularly to an aircraft undercarriage.

BACKGROUND OF THE INVENTION

Aircraft towing devices are hitched or fastened to the steerable bottom portion of the nose undercarriage of an aircraft in order to pull, push, and/or turn the aircraft in the desired direction. Once the towing device has taken charge of the aircraft, it is the towing operator who directs the aircraft, with the steering control system of the aircraft being deactivated. Such towing devices are generally very maneuverable and present a turning radius that is small, making it easier to perform positioning maneuvers under the aircraft, and also to move it. As a result, the towing operator can impart a large angular stroke to the steerable portion of the nose undercarriage, and this might possibly go beyond an authorized limit angle threshold. Under such circumstances, permanent damage might be done to the steering control system if it is left mechanically connected to the steerable bottom portion. Since the steering control system is not active during towing, the angular movement of the steerable bottom portion can neither be limited, nor even measured, so there is no way of warning the towing operator. Furthermore, the effects of such an excessive angular stroke (or angular overstroke) on the steerable bottom portion, and in particular on the steering control system, cannot always be seen by a maintenance operator on mere visual inspection. Consequently, without a thorough examination of the undercarriage, requiring it to be dismantled in part, there is a risk that such angular overstroke will not always be detected and that the event will remain hidden.

For example, on aircraft of the Airbus A320 type, the steering control system presents a maximum angular stroke of ±95° about the center position. It is appropriate to select a limit angle threshold, e.g. 92°, in order to detect that there is a risk of angular overstroke before that leads to potential damage. In this respect, Document FR 2 963 606 proposes fitting the undercarriage with a safety device that, according to that invention, comprises detector means that are independent of the steering control system and that serve to detect that the steerable bottom portion has turned through an angle that is equal to or greater than a limit angle threshold, and warning means that generate a warning in response to such turning. Specifically, the described detector means include a proximity sensor (e.g. of electromagnetic or optical type) that is fastened to a support that is secured to the strut of the undercarriage and that extends facing a circularly arcuate track that is secured to a steerable bottom portion, itself mounted to turn relative to the strut. The track is relatively narrow at its center, but it widens going from the center towards its ends. So long as the steerable bottom portion remains within usual steering angles, the proximity sensor is too far away from the track for its signal to change state. If the bottom portion is steered so as to approach the limit angle threshold, the width of the track gives rise to the track and the proximity sensor coming closer together, ending up with a change of state in the signal from the proximity sensor when the steering angle reaches the limit angle threshold. The change in the state of the signal from the sensor serves to detect that the limit angle threshold has been reached. Another embodiment shown in that document relates to detector means comprising lugs carried at the ends of the track in order to form obstacles for a lever that is tiltably mounted on a support that is secured to the strut in order to be tilted from a projecting position towards a tilted position when the lever comes into contact with one or the other of the lugs. A sensor co-operates with the lever so that its signal changes state when the lever goes from the projecting position towards a tilted position.

Nevertheless, those devices rely on using an electromagnetic sensor, which might fail, and which might therefore be inactive at the time an angular overstroke occurs. That document also suggests using mechanical visual indicators, which have the advantage of much greater reliability and which can be seen directly by the person doing the towing, or by maintenance personnel. In particular, that document suggests using the tiltable lever as a visual indicator of overstroke when it is taken to a tilted position, or indeed suggests using breakable pegs that are broken in the event of an overstroke. Nevertheless, the overstroke information is signaled by a mechanical element being retracted or lost. That information will not be perceived or understood by inexperienced personnel.

OBJECT OF THE INVENTION

The invention seeks to propose an aircraft undercarriage fitted with visual warning means that, in the event of an angular overstroke, have a state that is likely to be better perceived and understood.

SUMMARY OF THE INVENTION

In order to achieve this object, there is provided an aircraft undercarriage comprising a top portion secured to the aircraft and a steerable bottom portion carrying wheels and suitable for being steered either by a steering control system fitted to the undercarriage or else by an external towing device, the undercarriage being fitted with visual warning means for indicating an angular overstroke corresponding to the steerable bottom portion turning through an angle that is equal to or greater than a limit angle threshold, the visual warning means comprising at least one visual indicator mounted on one of the top and steerable bottom portions of the undercarriage to move between a first stable position indicating normal operation of the undercarriage and a second stable position indicating that an angular overstroke has occurred. According to the invention, the first position is a retracted position that is invisible and the second position is an extended position that is visible, the visual indicator being pushed in the event of an angular overstroke from the retracted position to the extended position by cooperating with an obstacle mounted on the other one of the top and steerable bottom portions of the undercarriage.

As a result, the operation of the visual indicator is purely mechanical and thus very reliable. Also, the visual indicator being visible clearly indicates that an angular overstroke has occurred. Even inexperienced personnel will suspect that the appearance of a visual indicator that is not normally visible means that there is a problem that needs to be checked. Preferably, the visual indicator is colored, making it easier to detect visually.

In a particular aspect of the invention, the visual indicator is associated with means for locking it in its extended position. As a result, the visual indicator cannot be pushed back into its retracted position. This provision ensures that the angular overstroke information cannot be hidden by pushing back the visual indicator. Once the steering control system has been inspected, the visual indicator should be replaced by another visual indicator in its retracted position, or the visual indicator should be re-set by overriding the locking means.

The invention also provides an aircraft provided with such an undercarriage.

BRIEF DESCRIPTION OF THE DRAWINGS

The invention can be better understood in the light of the following description of particular embodiments of the invention given with reference to the accompanying drawings, in which:

FIG. 1 is a fragmentary perspective view of an aircraft nose undercarriage fitted with angular overstroke mechanical sensors in a particular embodiment of the invention, the wheels being shown in their center position for straight-line taxiing;

FIG. 2 is a fragmentary perspective view of the same undercarriage, with its steerable portion turned through an angle close to the limit angle threshold;

FIG. 3 is a section view of one of the mechanical sensors, with its visual indicator in its retracted position and invisible; and FIG. 4 is a section view of one of the mechanical sensors, with its visual indicator in its extended position and visible.

DETAILED DESCRIPTION OF THE INVENTION

With reference to FIG. 1, the undercarriage 1 shown comprises in conventional manner a top portion including a strut 2 that is connected to the structure of the aircraft, and a steerable bottom portion 3 carrying wheels that can be turned to enable the aircraft to be steered while taxiing. The steerable bottom portion 3 can be steered either by a steering control system 4 arranged on the strut 2 in order to cause the steerable bottom portion 3 to turn in response to a steering setpoint from the pilot, or else by an external towing device that an operator has hitched to the steerable bottom portion 3. In this example, the steerable bottom portion 3 includes a sleeve 5 that is pivotally mounted on the strut 2, being constrained to turn with steering of the wheels by means of a scissors linkage 6, the steering control system 4 acting directly on the sleeve 5 (e.g. by means of a rack-and-pinion connection). This is well known and is recalled merely to situate the context of the invention.

In a particular embodiment of the invention, the sleeve 5 carries two mechanical sensors 9, each having a finger 11 that projects so as to co-operate with an obstacle 12 carried by the strut 2. The sensors are arranged on the sleeve 5 on either side of the obstacle 12 so that the fingers 11 come into contact with the obstacle 12 when the sleeve 5 has turned through an angle equal to the limit angle threshold, equal in this example to 90°, on either side of a center position.

In FIG. 2, in which the wheels have been turned through 90°, it can be seen that the finger 11 of one of the mechanical sensors 9 has come to bear against the obstacle 12.

As can be seen more clearly in FIG. 3, each mechanical sensor 9 has a body 10 fastened to a support 22 of the sleeve 5 (in this example the support is integral with the sleeve, however the support could be fitted thereon). To do this, the body 10 is inserted in an orifice in the support 22 and the axial position of the body 10 of the support 22 is finely adjusted by using an adjustment shim 23 arranged on one side of the support 22. The body is held stationary on the support 22 by means of a nut 25 screwed on the body 10, and it is locked by tightening a stop washer 24. The body 10 contains a jacket 21 in which a slide 13 is slidably mounted. At one end, the slide 13 carries the finger 11, and at its other end it carries a visual indicator 14, which in this example is covered in a sheath 15 of striking color, or which could be painted in a striking color (e.g. bright red or fluorescent or phosphorescent orange). A spring 16 urges the slide 13 towards a first position, as shown in FIG. 3, in which the finger 11 projects from the body 10 while the visual indicator 14 is fully retracted inside the body 10, and is thus not visible. As shown in FIG. 4, when the sleeve 5 is turned through an angle that reaches or exceeds the limit angle threshold, the finger 11 comes into contact with the obstacle 12, thereby pushing back the slide 13 against the action of the spring 16 towards a second position in which the visual indicator 14 projects from the body 10, and is thus visible. A transparent cover 17 serves to protect the visual indicator 14 while leaving it apparent in a manner that is fully visible from the outside. In this example, the jacket 21 is extended by catches 18 enabling the slide 13 to be retained automatically in the second position, such that this position is stable and locked. For this purpose, the slide 13 includes a cone 19 that serves to space apart the ends 20 of the catches 18 when the finger 11 is pushed and the slide 13 passes from the first position to the second position. The catches catch behind the cone 19 after passing over it, thereby locking the slide 13 in the second position against the action of the spring 16. Once the catches 18 have re-closed, the visual indicator 14 cannot be pushed back into the body 10 without dismantling the mechanical sensor 9.

In the second position, the visual indicator 14 covered in its colored sheath 15 is then clearly visible from the outside, thereby indicating that an angular overstroke has taken place.

The limit angle threshold is selected to be less than a threshold at which the steering control system runs the risk of being damaged. For example, on aircraft of the Airbus A320 type, the steering control system presents a maximum angular stroke of ±95° about the center position. It is appropriate to select a smaller limit angle threshold, e.g. 90°, in order to detect that there is a risk of angular overstroke before that leads to potential damage.

Where appropriate, the movement of the slide 13 from the first position to the second position can be detected by means of a movement sensor in order to generate an electrical signal that is used by warning means in various ways: an event may be stored in an event log that is consulted regularly by maintenance teams; or if a towing device is hinged to the undercarriage, the warning means may deliver a signal to the operator, e.g. a sound signal indicating that too great an angular stroke has been imparted and that the operator is about to damage the steering control system. The event may also be indicated in the cockpit of the aircraft, so that the pilot is immediately informed about this event.

The invention is not limited to the above description, but on the contrary covers any variant coming within the ambit defined by the claims.

In particular, although the invention is illustrated in an application to a nose undercarriage provided with a steering control system, the invention applies to any undercarriage having a bottom portion that is steerable and suitable for being hitched to a towing device.

Although the visual indicators in this example are secured to the steerable bottom portion of the undercarriage and the obstacle is secured to the top portion of the undercarriage, this configuration could naturally be inverted.

Preferably, two mechanical sensors, and thus two visual indicators, are used as described above for the purpose of indicating the direction in which the bottom portion of the undercarriage has been turned in order to give rise to the angular overstroke. Nevertheless, it is possible to use a single mechanical sensor on one of the top and steerable bottom portions of the undercarriage, having its visual indicator pushed from its first position to its second position by two distinct obstacles that are arranged on the other one of the top and steerable bottom portions of the undercarriage so as to push the visible indicator when the steerable bottom portion reaches the limit angle threshold on one side or on the other side of the center position.

Finally, although the visual indicator is associated with catch means for locking it in its visible, extended position, it is possible to use other locking means, or to omit locking means, leaving it possible to return the indicator to its invisible position directly on the aircraft.

The invention claimed is:

1. An aircraft undercarriage comprising a top portion (2) secured to the aircraft and a steerable bottom portion (3) carrying wheels and suitable for being steered either by a steering control system (4) fitted to the undercarriage or else by an external towing device, the undercarriage being fitted with visual warning means (9) for indicating an angular overstroke corresponding to the steerable bottom portion turning through an angle that is equal to or greater than a limit angle threshold, the visual warning means comprising at least one visual indicator (14) mounted on one of the top and steerable bottom portions of the undercarriage to move between a first stable position indicating normal operation of the undercarriage and a second stable position indicating that an angular overstroke has occurred, the undercarriage being characterized in that the first position is a retracted position that is invisible and the second position is an extended position that is visible, the visual indicator being pushed in the event of an angular overstroke from the retracted position to the extended position by cooperating with an obstacle (12) mounted on the other one of the top and steerable bottom portions of the undercarriage.

2. An undercarriage according to claim 1, wherein the extended position of the visual indicator (14) is a locked position.

3. An undercarriage according to claim 1, wherein the visual warning means comprise at least one mechanical sensor (9) comprising a body (10) fastened on one of the top and steerable bottom portions of the undercarriage, the body (10) receiving a slide (13) carrying the visual indicator and adapted to slide between a first position corresponding to the invisible, first position of the visual indicator, and a second position corresponding to the visible, second position of the visual indicator, the slide including a finger (11) adapted to be pushed by the obstacle (12) in order to cause it to pass from the first position to the second position.

4. An undercarriage according to claim 3, wherein the mechanical sensor (9) includes return means (16) for returning the slide (13) towards the first position.

5. An undercarriage according to claim 3, wherein the mechanical sensor (9) includes locking means (18, 19) for locking the slide in the second position, so that the visible, extended position of the visual indicator is a locked position.

6. An undercarriage according to claim 5, wherein the locking means include catches (18) co-operating with a cone (19) carried by the slide (13).

7. An undercarriage according to claim 3, wherein the body (10) carries a transparent cover (17) protecting the indicator when it is in the visible, extended position, while also leaving it visible from the outside.

8. An undercarriage according to claim 3, wherein the visible indicator is coated in a fluorescent or phosphorescent color (15).

9. An undercarriage according to claim 3, wherein the body (10) is fastened on a support (22).

10. An undercarriage according to claim 3, including two mechanical sensors (9) fastened on the steerable bottom portion of the undercarriage, the mechanical sensors being arranged on either side of the obstacle (12) carried by the top portion of the undercarriage so that it co-operates with one or the other of the mechanical sensors when the steerable bottom portion comes into an angular overstroke situation on one side or the other of a center position of the steerable bottom portion.

11. An aircraft provided with an undercarriage according to claim 1.

* * * * *